(12) United States Patent
Kwakye et al.

(10) Patent No.: US 10,436,119 B2
(45) Date of Patent: Oct. 8, 2019

(54) ASSEMBLY FOR PASSING AN ELECTRICAL HARNESS INTO A TURBINE ENGINE

(71) Applicant: Safran Aircraft Engines, Paris (FR)

(72) Inventors: George Kwakye, Moissy-Cramayel (FR); Benoit Marie Bernard Kieffer, Moissy-Cramayel (FR); Antonio Matias, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 15/561,156

(22) PCT Filed: Mar. 24, 2016

(86) PCT No.: PCT/FR2016/050661
§ 371 (c)(1),
(2) Date: Sep. 25, 2017

(87) PCT Pub. No.: WO2016/156706
PCT Pub. Date: Oct. 6, 2016

(65) Prior Publication Data
US 2018/0080385 A1 Mar. 22, 2018

(30) Foreign Application Priority Data
Mar. 31, 2015 (FR) ..................... 15 52763

(51) Int. Cl.
*F02C 7/32* (2006.01)
*B60R 16/02* (2006.01)
*H02G 3/22* (2006.01)
*H02G 3/03* (2006.01)
*H02G 3/04* (2006.01)
(Continued)

(52) U.S. Cl.
CPC ............ *F02C 7/32* (2013.01); *B60R 16/0222* (2013.01); *H02G 3/03* (2013.01); *H02G 3/0481* (2013.01); *H02G 3/22* (2013.01); *F05D 2220/32* (2013.01); *H01B 7/0045* (2013.01); *H02G 15/013* (2013.01)

(58) Field of Classification Search
CPC ................ F02C 7/32; H02G 3/03; H02G 3/22
USPC ....................................... 174/72 A
See application file for complete search history.

(56) References Cited

U.S. PATENT DOCUMENTS 3,068,315 A * 12/1962 McGrath .................. H01R 4/62
174/10
5,906,576 A * 5/1999 Upsher ................ G02B 6/0006
362/294
(Continued)

FOREIGN PATENT DOCUMENTS

| FR | 2 958 373 A1 | 10/2011 |
| FR | 2 990 745 A1 | 11/2013 |
| FR | 2 990 805 A1 | 11/2013 |

(Continued)

*Primary Examiner* — Dhiru R Patel
(74) *Attorney, Agent, or Firm* — Blank Rome LLP

(57) ABSTRACT

An assembly for passing an electrical harness through a wall includes a tubular metal end piece passing right through the wall and housing the electrical harness. The assembly further includes a sleeve made from heat-shrinkable material extending around an end part of the tubular end piece and of the electrical harness. The assembly further includes structures for extracting heat from the tubular end piece that are arranged on the side of the end piece surrounded by the heat-shrinkable sleeve.

10 Claims, 3 Drawing Sheets

(51) Int. Cl.
*H02G 15/013* (2006.01)
*H01B 7/00* (2006.01)

(56) References Cited

U.S. PATENT DOCUMENTS 6,359,223 B1    3/2002   Daoud
7,709,739 B2 *   5/2010   Ferragut .............. H02G 3/0633
                                                       174/113 C

FOREIGN PATENT DOCUMENTS

FR        2 996 070 A1    3/2014
WO     WO 00/19082 A2    4/2000

\* cited by examiner

ASSEMBLY FOR PASSING AN ELECTRICAL HARNESS INTO A TURBINE ENGINE

This application is a national phase of PCT/FR2016/050661, filed on Mar. 24, 2016 which claims priority to FR1552763 filed Mar. 31, 2015. The content of those applications are hereby incorporated by reference.

The present invention relates to an assembly for passing an electrical harness through a wall, in particular in an intermediate turbine-engine casing. It also relates to a casing and a turbine engine comprising such a casing or such an assembly.

As is known, a turbine engine comprises an intermediate casing arranged between an upstream low-pressure compressor and a downstream high-pressure compressor. The intermediate casing comprises a plurality of radial arms joining concentric walls of revolution intended to form surfaces delimiting the primary and secondary airflows internally and externally. The radial arms allow the passage of services such as electrical harnesses in particular, which pass from the inside of the turbine engine to an accessory box carried by the nacelle of the turbine engine and arranged radially outside the secondary airflow.

An electrical harness normally comprises electrical cables comprising an electrically insulating external layer, these cables being covered in particular with a textile sheath for limiting wear on the insulating layers, and then, externally to the textile sheath, a metal sheath intended to protect the electrical signals from surrounding electromechanical disturbances. This metal sheath is normally covered with a heat-shrinkable sleeve intended to reduce wear on the metal sheath.

To pass the electrical cables, through walls of revolution, the electrical harness is inserted in a metal end piece engaged in an orifice in a wall of revolution of the intermediate casing. A sleeve made from heat-shrinkable material is used on either side on the wall. A first sleeve covers one end of the metal end piece and part of the axial length of the metal sheath. Likewise, on the other side of the wall a second sleeve covers an end of the metal end piece and part of the axial length of the metal sheath.

In operation, the temperature of the air in the casing arms situated in the secondary air duct is lower than the temperature of air in the inter-duct space (between the primary annular duct and the secondary annular duct), so that it is possible to use a sleeve made from heat-shrinkable material the temperature resistance of which is lower that the temperature resistance of the heat-shrinkable material used in the inter-duct space.

However, it has been found that heat-conduction phenomena in the metal end piece may lead to a significant increase in the temperature of the heat-shrinkable sleeve used in the casing arm of the secondary duct, which may lead to auto-ignition thereof.

The aim of the invention is in particular to afford a simple, effective and economical solution to the problems of the prior art described above.

To this end, it proposes an assembly for passing an electrical harness through a wall, comprising a tubular metal end piece passing right through the wall and housing the electrical harness, a sleeve made from heat-shrinkable material extending around an end part of the tubular end piece and of the electrical harness, characterised in that it comprises means for extracting heat from the tubular end piece that are arranged on the side of the end piece that is surrounded by the heat-shrinkable sleeve.

The invention proposes to integrate heat-extraction means at the end piece so as to limit the transmission of heat to the heat-shrinkable sheath and thus prevent auto-ignition thereof in operation.

Preferentially, the tubular end piece comprises an annular collar applied to the wall and disposed between the wall and said heat-extraction means. The collar provides a positioning of the end piece in the orifice in the wall while coming into abutment on the wall.

According to another feature of the invention, the heat-extraction means comprise a covering metal sheath entirely surrounding the heat-shrinkable sleeve and fixed to a first end situated on the wall side by clamping on the tubular end piece.

The use of a metal sheath makes it possible to effect a conduction of heat to the metal sheath surrounding the heat-shrinkable sheath rather than to the heat-shrinkable sleeve. In addition, the metal sheath provides a confinement of the heat-shrinkable sleeve by limiting the quantity of oxygen in contact with the sleeve, which makes it possible to further reduce the risks of auto-ignition of the sleeve.

According to another feature of the invention, said first end of the covering metal sheath is folded on itself radially inwards and gripped by a first member interposed radially between the first curved end and the rest of the covering metal sheath.

A second clamping member can be applied on a second end of the covering metal sheath opposite to the first end that is in contact with the heat-shrinkable sleeve.

According to yet another feature of the invention, said metal sheath is produced from a material the thermal conductivity of which is higher than that of the tubular end piece.

The metal sheath may be a metal braid.

In one embodiment of the invention, the heat-extraction means comprise annular grooves disposed in alternation, along the axis of the end piece with annular ribs on the end piece.

The invention also relates to a casing, in particular an intermediate casing for a turbine engine, comprising an assembly of the previously described type, in which said wall is a substantially cylindrical wall delimiting the radially internal flow surface of a gas flow.

The invention also relates to a turbine engine such as a turbojet engine, characterised in that it comprises an assembly as described above or a casing as described in the previous paragraph.

The invention will be understood better and other details, advantages and features of the invention will emerge from a reading of the following description given by way of non-limitative example with reference to the accompanying drawings, in which.

Figure 1:
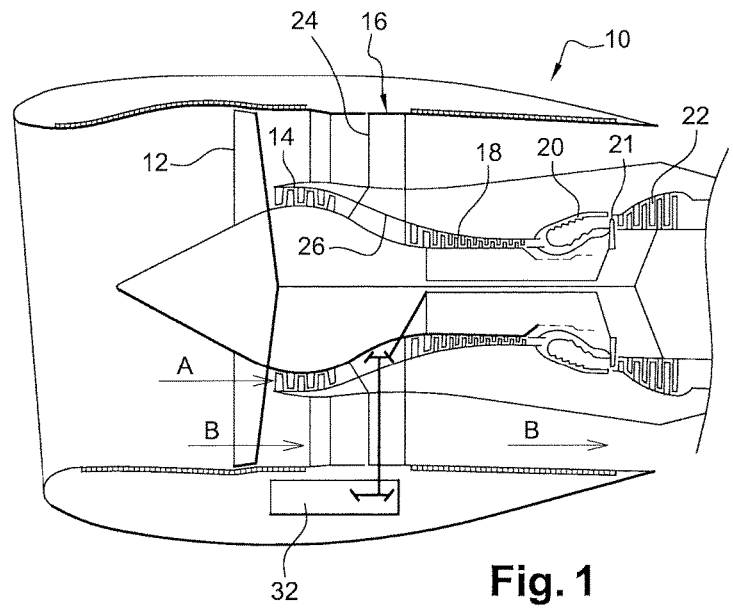
FIG. 1 is a schematic view in axial section of a bypass turbine engine according to the prior art.

Reference is made first of all to FIG. 1, which shows a turbine engine 10 comprising, from upstream to downstream, a fan 12, a low-pressure compressor 14, an intermediate casing 16, a high-pressure compressor 18, a combustion chamber 20, a high-pressure turbine 21 and a low-pressure turbine 22. The air entering the turbine engine divides into a primary airflow (arrow A) that flows inside the low- and high-pressure compressors 14, 18 to the combustion chamber 20 and then through the high- and low-pressure turbines 21, 22, and a secondary airflow (arrows B) that by-passes the compressor 14, 18, the combustion chamber 20 and the turbine 21, 22.

The intermediate casing 16 comprises structural arms 24 extending radially outwards. The intermediate casing 16 comprises an internal wall of revolution 26 delimiting externally the flow duct of the primary airflow and an external wall of revolution 28 delimiting internally the flow duct of the secondary airflow.

Figure 2:
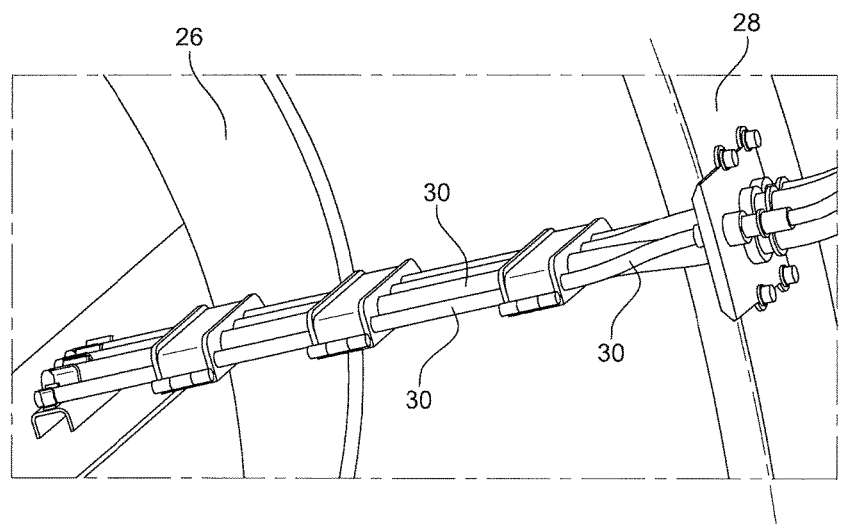
FIG. 2 is a schematic view of an arm of an intermediate casing of a turbine engine.

Some of the radial arms 24 such as for example the one arranged angularly at three o'clock with respect to the dial of a watch, when looking at the turbine engine from upstream, comprise electrical harnesses 30 for passing electrical cables (FIG. 2). These harnesses 30 pass from an item of equipment to an accessory box 32 as shown in FIG. 1.

Each electrical harness 30 comprises a set of electrical cables that are covered with a textile sheath itself covered with an internal metal sheath and then a sleeve.

The electrical cables pass through an orifice in the external wall of revolution 28 in a tubular end piece 34, preferably metal, for example made from stainless steel, of axis 35. The wall 28 is produced in two half-pieces, preferably made from aluminium alloy, which lock the end piece 34 longitudinally in the direction of the axis 35. To this end, the two half-pieces may comprise a cutout with a shape complementary to a narrowed cross section of the end piece. In such an embodiment, it is not necessary to produce an externally threaded end piece 34 and to fix the end piece 34 with respect to the wall 28 by means of a nut screwed onto the thread of the end piece.

Figure 3:
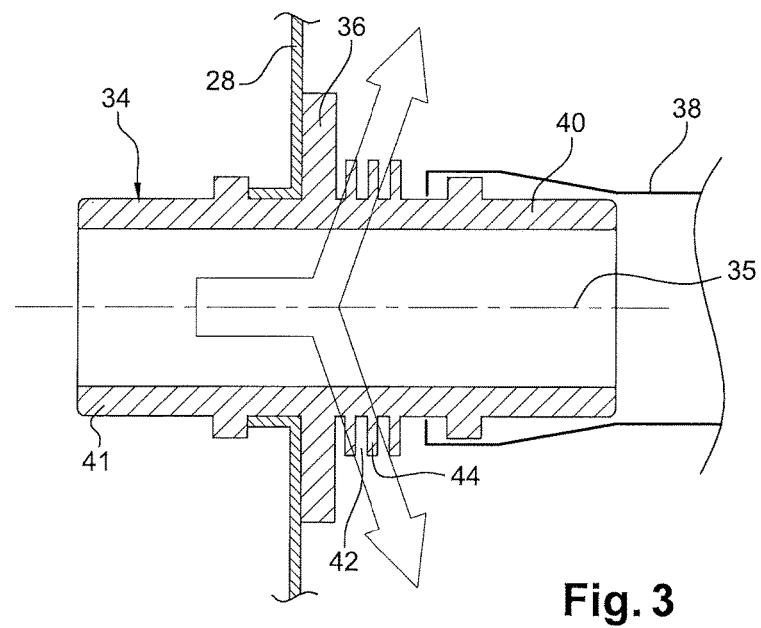
FIG. 3 is a schematic view in cross section of an assembly according to a first embodiment of the invention.

According to the invention, heat-extraction means are provided. Thus, in a first embodiment of the invention shown in FIG. 3, the tubular end piece 34 comprises an annular collar 36 applied to the external face of the external wall of revolution 28. The electrical harness 30 engaged in the tubular end piece 34 is covered with a sleeve 38 made from heat-shrinkable material, preferably fluoroelastomer material, which also covers a first end part 40 of the end piece 34 situated on the same side as the collar 36 with respect to the wall 28. The end piece 34 further comprises a second end 41 situated on the opposite side to the collar 36 with respect to the wall 28. The end parts 40 and 41 are connected together. The end piece 34 is locked at least with respect to translation with respect to the wall 28 along the axis 35. It may be welded to the wall 28 or mounted free to rotate with respect to the wall 28 about the axis 35.

The heat-extraction means are arranged on the axis of the sleeve between the annular collar 36 and the end of the sleeve covering the end part 40 of the end piece 34. These heat-extraction means comprise annular grooves 42 and annular ribs 44 on the end piece. The grooves 42 are disposed in alternation along the axis 35 of the end piece 34 with the annular ribs 44 so as to form a heat-exchange means. The ribs 44 are preferably in one piece with the first end part 40. Advantageously, the collar 36 is disposed between the wall and the ribs 44.

Thus, in operation, when the heat flows by thermal conduction in the end piece 34, preferably metallic, the grooves 42 and ribs 44 provide an exchange of heat with the external ambient air, limiting the quantity of heat flowing to the heat-shrinkable sleeve 38.

Figure 4:
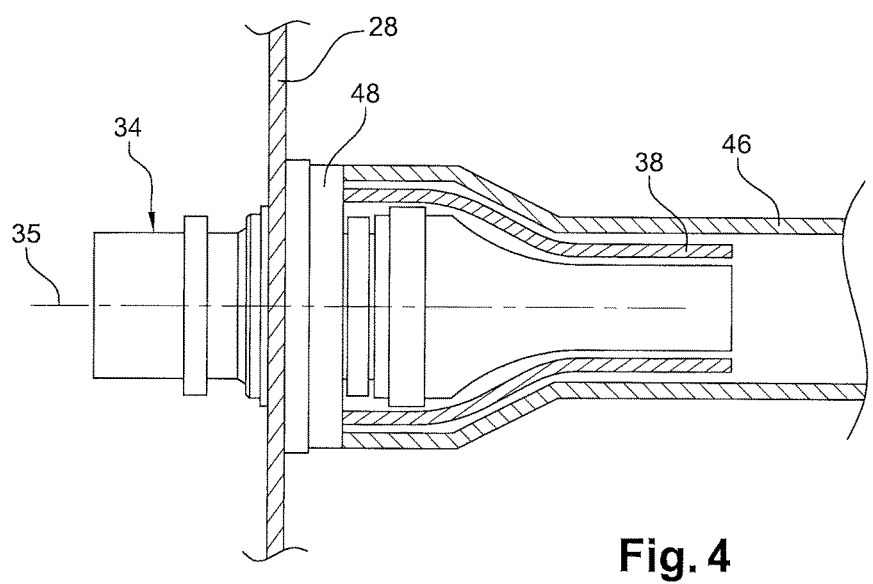
FIG. 4 is a schematic view in axial section according to a second embodiment of the invention.

According to a second embodiment shown in FIG. 4, the heat-extraction means comprise an external covering metal sheath 46, for example made from nickel-plated copper that covers the heat-shrinkable sleeve 38 and is fixed at its end situated on the wall 28 side by clamping to the tubular metal end piece by means of a collar 48.

Figure 5:
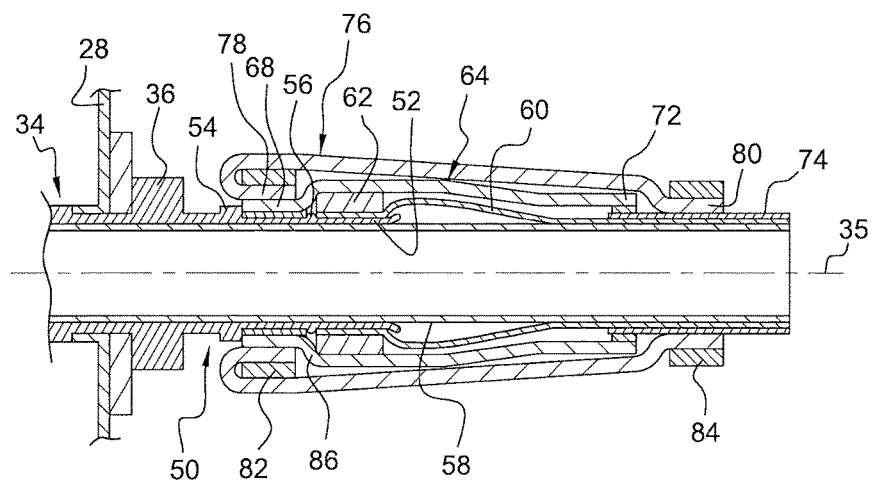
FIGS. 5 and 6 are schematic views of two variant embodiments of the second embodiment.
Figure 6:
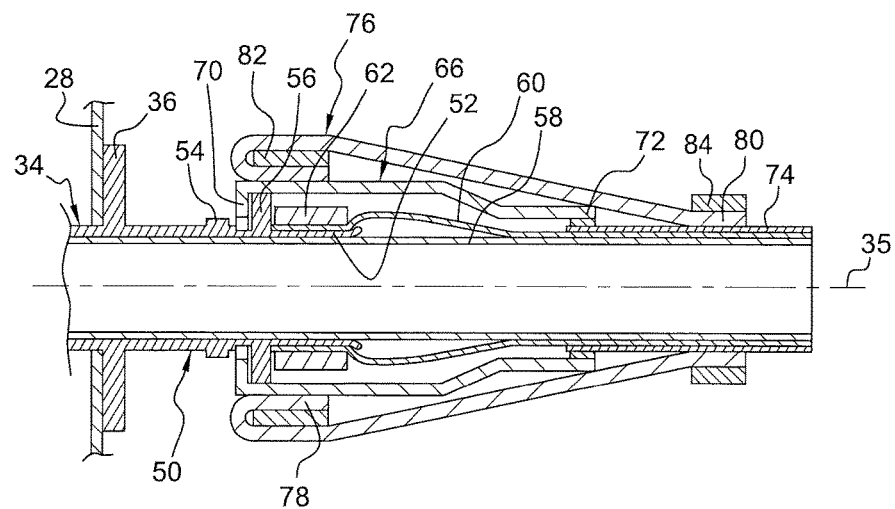

More particularly, FIGS. 5 and 6 show two variants of the second embodiment.

In a similar manner to what was described previously, the end piece 34 comprises an annular collar 36. The end part 50 of the end piece 34, disposed on the same side as the collar 36 with respect to the wall 28, comprises a cylindrical end portion 52 and two annular ribs 54, 56, arranged radially externally as from the end part 50 and spaced apart axially from each other along the axis 35 and arranged between the cylindrical portion 52 and the annular collar 36. As indicated previously, the electrical cables are surrounded externally by a textile sheath 58 that is inserted in the tubular end piece 34. An internal metal sheath 60 surrounds the textile sheath 58 in order to limit wear thereon and provides electromechanical protection for the electrical cables. The end of the internal metal sheath 60 surrounds the cylindrical portion end portion 52 of the end piece 34 and is clamped on the cylindrical portion 52 by a clamping collar 62 for example.

A heat-shrinkable sleeve 64, 66 is fixed by adhesive bonding to a first end 68, 70 on the end part 30 of the tubular end piece 34 between the two annular grooves 54, 56 and for a second opposite end 72 on a free end of a thermal protection sheath 74 externally surrounding the internal metal sheath 60. The sheath 74 may for example be produced from nickel-plated copper.

In the two variants of the invention shown in FIGS. 5 and 6, the heat-extraction means comprise a covering sheath 76 disposed on the same side as the collar 36 with respect to the wall 28 and entirely surrounding the sleeve 64, 66. Said covering metal sheath 76 comprises a first end 78 situated in the vicinity of the annular collar 36 and a second end 80 situated opposite, that is to say distant from the collar.

The first end 78 of the covering sheath 76 is folded or curved on itself radially and 180° towards the inside and is fixed by a first clamping member 82 such as a collar on the first end 68, 70 of the sleeve 64, 66. Said first clamping member 82 is thus interposed between the first folded end 78 and the remainder of the sheath 76. The second end 80 of the covering sheath 76, which is not folded, is fixed by clamping by means of a collar 84 for example on the second free end 80 of the thermal protection sheath 74 externally surrounding the internal metal sheath 60.

Thus, according to the invention, the covering metal sheath 76 provides confinement of the heat-shrinkable sleeve 64, 66 limiting the supply of oxygen necessary for auto-ignition of the heat-shrinkable sheath 64, 66. The external covering metal sheath 76 also allows an effective diffusion of the heat radially outwards, which limits the concentration of heat of the tubular metal end piece, preferably metallic, at the sleeve 64, 66 and also at the wall 28. Although there is no contact between the end part 50 of the tubular end piece 34 and the metal sheath 76, the sleeve 64, 66 provides diffusion of heat to the sheath 76, which radiates the heat outwards.

In a variant, it would be possible to fix the covering metal sheath 76 directly to the end part 50 of the end piece 34 in order to achieve better transfer of heat.

The embodiments in FIGS. 5 and 6 differ essentially through the fact that the sleeve 64 is in abutment externally on the clamping collar 62 in the case of the embodiment in FIG. 5 whereas the sleeve 66 is situated at a distance from the collar 62 in the case of the embodiment in FIG. 6, which makes it possible to avoid wear of the sleeve 66 on the collar 62. The sleeve 64 of the embodiment in FIG. 5 thus comprises an annular projection 86 that is not present in the embodiment in FIG. 6. The stacking of the layers of the harness is simpler to achieve with the embodiment in FIG. 5 than with the embodiment in FIG. 6. In FIG. 6, the toe of the first end 70 of the sleeve 66 extends in a direction radially inwards in the case of the embodiment in FIG. 6 and extends cylindrically in the case of FIG. 5. In addition, in the latter embodiment, the clamping collar 62 is not in contact with the sleeve 66, which limits the friction of the sleeve on the collar 62 and consequently wear on the sleeve 66.

In the above description, the choice of the materials of the covering metal sheath 76 and of the tubular end piece 34 is such that said covering metal sheath is produced from a material the thermal conductivity of which is greater than that of said end piece.

Preferably, the covering metal sheath 76 is produced from a material of the nickel-plated copper metal braid type or copper-based alloy, whereas the tubular end piece is produced from stainless steel.

Thus, in operation, when the heat flows by thermal conduction in the end piece 34, the extraction of the heat from the end piece to the covering metal sheath 76 is facilitated. By exchange of heat with the external ambient air, the quantity of heat flowing to the heat-shrinkable sleeve 64, 66 is substantially limited.

The invention claimed is:

1. An assembly for passing an electrical harness through a wall, the assembly comprising:
    a tubular metal end piece passing right through an orifice in the wall and housing the electrical harness;
    a heat-shrinkable sleeve made from heat-shrinkable material extending around an end part of the tubular metal end piece and of the electrical harness; and
    means for extracting heat from the tubular metal end piece, the means for extracting heat arranged, with respect to the wall, on a side of the tubular metal end piece surrounded by the heat-shrinkable sleeve, wherein the means for extracting heat includes a metal sheath entirely surrounding the heat-shrinkable sleeve, and wherein the tubular metal end piece comprises an annular collar applied to the wall and disposed between the wall and said means for extracting heat.

2. The assembly according to claim 1, wherein the metal sheath is fixed to a first end situated on the wall side by clamping on the tubular metal end piece.

3. The assembly according to claim 2, wherein said first end of the metal sheath is folded on itself radially inwards and clamped by a first member interposed radially between the first end and the remainder of the metal sheath.

4. The assembly according to claim 3, wherein a second clamping member is applied to a second end of the metal sheath opposite to the first end that is in contact with the heat-shrinkable sleeve.

5. The assembly according to claim 2, wherein said metal sheath is produced from a material having a thermal conductivity greater than that of the tubular metal end piece.

6. The assembly according to claim 2, wherein the metal sheath is a metal braid.

7. The assembly according to claim 1, wherein the means for extracting heat comprise:
    annular grooves disposed in alternation along an axis of the tubular metal end piece with annular ribs on the tubular metal end piece.

8. An intermediate casing for a turbine engine, comprising an assembly according to claim 1, wherein said wall is a substantially cylindrical wall delimiting a radially internal flow surface of a gas flow.

9. A turbine engine comprising an assembly according to claim 1.

10. An assembly for passing an electrical harness through a wall, comprising:
    a tubular metal end piece passing right through an orifice in the wall and housing the electrical harness; and
    a heat shrinkable sleeve made from heat-shrinkable material extending around an end part of the tubular metal end piece and of the electrical harness paid; and
    means for extracting heat from the tubular metal end piece, the means for extracting heat arranged, with respect to the wall, on the side of the tubular metal end piece surrounded by the heat-shrinkable sleeve, wherein the means for extracting heat includes a metal sheath entirely surrounding the heat-shrinkable sleeve.

* * * * *